July 7, 1964 J. C. HUBBS 3,140,449
ELECTROMETER AMPLIFIER
Filed Aug. 22, 1960 4 Sheets-Sheet 1

INVENTOR.
JOHN C. HUBBS

BY Carl Hoppe

ATTORNEY

July 7, 1964

J. C. HUBBS 3,140,449

ELECTROMETER AMPLIFIER

Filed Aug. 22, 1960

4 Sheets-Sheet 2

INVENTOR.
JOHN C. HUBBS

BY

Carl Hoppe

ATTORNEY

July 7, 1964 J. C. HUBBS 3,140,449

ELECTROMETER AMPLIFIER

Filed Aug. 22, 1960 4 Sheets-Sheet 3

INVENTOR.
JOHN C. HUBBS

BY

[signature]

ATTORNEY

July 7, 1964 J. C. HUBBS 3,140,449

ELECTROMETER AMPLIFIER

Filed Aug. 22, 1960 4 Sheets-Sheet 4

INVENTOR.
JOHN C. HUBBS

BY

Carl Hoppe

ATTORNEY

United States Patent Office 3,140,449

Patented July 7, 1964

3,140,449
ELECTROMETER AMPLIFIER

John C. Hubbs, Lafayette, Calif., assignor to E.H. Laboratories, Inc., Oakland, Calif., a corporation of California Filed Aug. 22, 1960, Ser. No. 51,100
2 Claims. (Cl. 330—100)

This invention relates generally to electric current measuring devices and more particularly to a general purpose instrument for making ultra-low A.-C. and D.C. measurements.

It is the principal object of this invention to provide a low noise instrument having high sensitivity for making ultra-low A.-C. and D.-C. current measurements.

It is a further object of this invention to provide an electric current measuring instrument having improved transient response, low flicker noise and excellent D.-C. stability.

The foregoing and other objects of this invention will become apparent to those skilled in this art upon an understanding of the following description considered in connection with the accompanying drawings illustrating a preferred embodiment of the present invention wherein FIG. 1 is a block diagram illustrating the basic circuit of the present invention;

Figure 1:
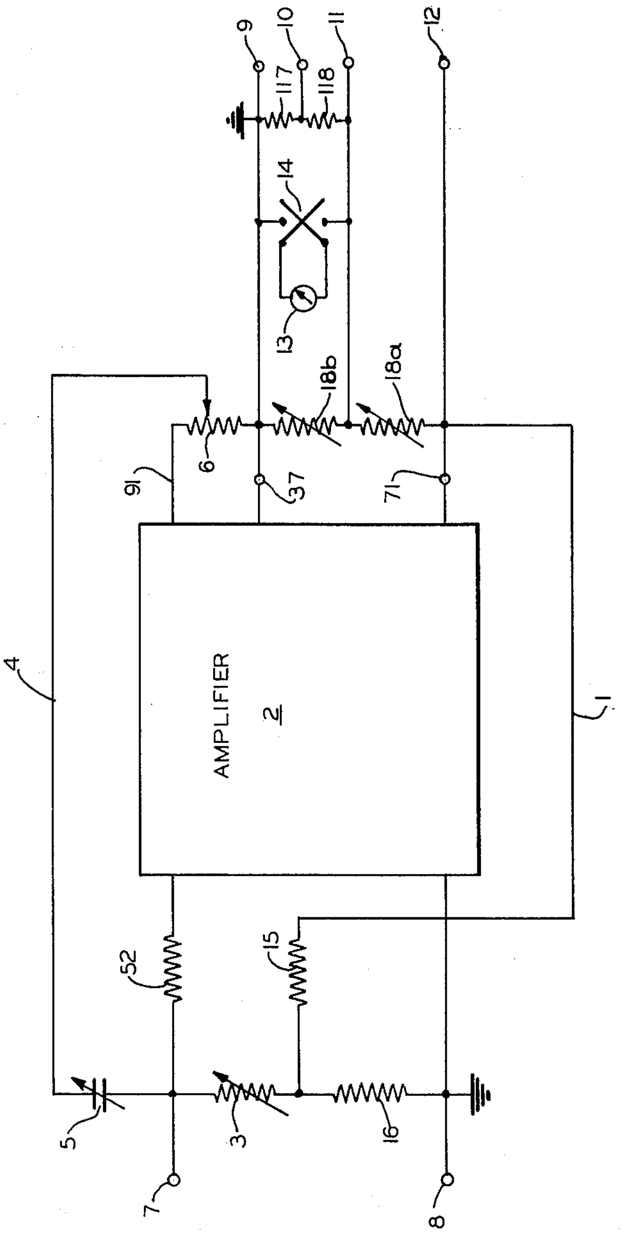

The exceptional sensitivity of the present invention is achieved by the use of a low-grid-current electrometer pentode as one stage of a multistage amplifier in combination with a high resistance input resistor. Improved transient response is accomplished by application of the negative capacity principle utilizing a double feedback system. As is illustrated in FIG. 1 negative feedback means 1 supplies a negative feedback from the output of amplifier 2 to one end of a high resistance input resistor 3. This feedback means stabilizes the gain of the overall system and reduces the input impedance, thereby reducing the effect of external cable and source capacities. A positive feedback means 4 is connected to the input through variable capacitor 5 to provide a positive feedback for neutralizing any stray internal capacities or external capacities introduced across the input resistor. The positive feedback is established by variable resistors 6, herein referred to as the neutralization control, at a value just sufficient to charge these unwanted capacities.

The input to be measured is supplied to a multistage amplifier 2 through terminals 7 and 8, the latter of which is grounded. The value of the input may be externally read across output terminals comprising grounded terminal 9 and one of a series of terminals 10, 11 or 12, or it may be read directly on panel meter 13 connected in parallel with terminals 9, 11 and having a polarity reversing switch 14.

The negative feedback is taken from the amplifier output through resistor 15 and it supplies to input resistor 3 a voltage 180° out of phase with the input. The input resistor 3 is connected in series with resistor 16 across input terminals 7 and 8. Input resistor 3 forms part of a multiple resistance range switch 17 including resistors **18*a*, 18*b* and more fully described in connection with FIG. 4. The negative feedback, connected at the junction between resistors 3 and 16, stabilizes the overall system gain and reduces the input impedance to a value equal to the resistance of input resistor 3 divided by the product of the open-loop gain of amplifier 2** and the feedback ratio. A reduction in the effective input impedance by a factor of 200–500 is achieved in the specific embodiment illustrated herein, reducing by the same factor the effect of external cable and source capacities.

Compensation for capacities across the input resistor is obtained by the positive feedback means 4 connected to input terminal 7. Adjustment of the variable neutralization control resistance 6 supplies a low impedance positive feedback current to cancel both internal and external capacities at low frequencies.

*Power Supply*

Figure 2:
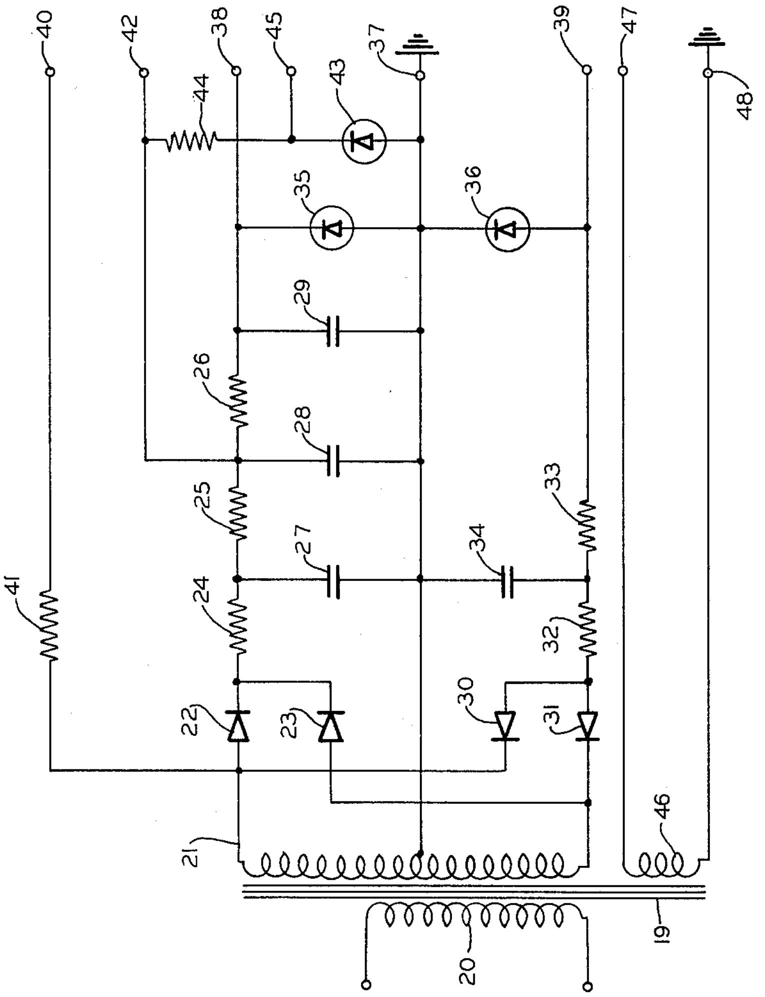
FIG. 2 is a circuit diagram of the power supply used in the preferred embodiment of this invention.

The power requirements of the amplifier in the illustrative embodiment of this invention are provided by the power supply illustrated in FIG. 2. Direct current is derived from transformer 19 having a 110 volt primary winding 20 and a center-tapped secondary winding 21. Full-wave rectification is provided across the entire secondary winding by diodes 22 and 23 feeding into a filter network comprising series resistors 24, 25 and 26 and parallel capacitors 27, 28 and 29. The full secondary winding also is rectified by diodes 30, 31 feeding into a filter network comprising series resistors 32, 33 and capacitor 34. A Zener diode 35 is provided for regulating the output of diode rectifiers 22 and 23 and Zener diode 36 is provided to regulate the voltage output of diodes 30 and 31. The center-tap of the secondary winding is grounded at terminal 37. A negative 100 v. output appears at terminal 39, and a positive 150 v. plate supply for the filamentary amplifier stages is provided at terminal 38.

A reduced A.-C. voltage is provided from half the secondary winding at terminal 40 through series resistor 41. This voltage is utilized in a response checking means described later in this specification.

A positive 200 v. electrometer plate supply is furnished at terminal 42 taken from the filter network of rectifier diodes 22, 23 at the junction between resistors 25 and 26. This voltage is regulated by Zener diode 43 connected in series with resistor 44 across terminals 37 and 42. The resultant voltage division produces a positive 15 v. output at terminal 45 for use in the electrometer amplifier stage hereinafter described.

A.-C. filament power for the last amplifier stage is supplied by a separate secondary winding 46 on power transformer 19, the output appearing at terminal 47 and grounded terminal 48.

The values of the several components of the power supply are as follows:

| | |
|---|---|
| Diodes **22**, **23**, **30**, **31** | International Rectifier, Type SD 500. |
| Resistor **24** | 33 ohms, 1 watt, 5%. |
| Resistor **25** | 180 ohms, 2 watts, 5%. |
| Resistor **26** | 3,000 ohms, 25 watts, Dalohm 3%. |
| Capacitors **27**, **28** | 50 mf./450 v. |
| Capacitor **29** | 0.1 mf./600 v., ceramic. |
| Resistor **32** | 1,000 ohms, 25 watts, Dalohm 3%. |
| Resistors **33**, **44** | 5,000 ohms, 25 watts, Dalohm 3%. |
| Capacitor **34** | 100 mf./450 v. |
| Diode **35** | Motorola 10M150Z10. |
| Diode **36** | Motorola 10M100Z10R. |
| Resistor **41** | 150,000 ohms, ½ watt, 5%. |
| Diode **43** | Motorola 10M15Z10. |

*Amplifier*

Figure 3:
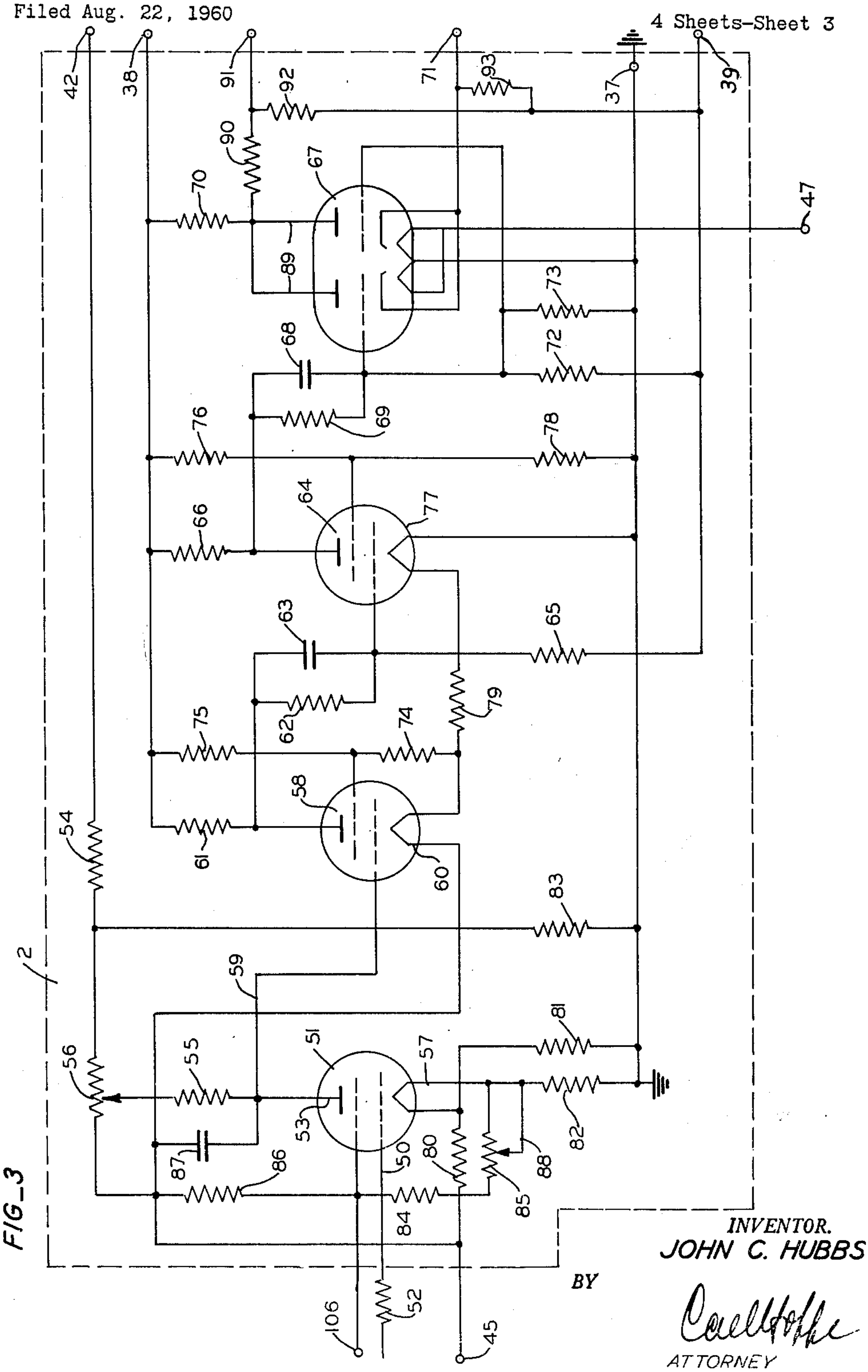
FIG. 3 is a circuit diagram of a multistage amplifier provided in the preferred embodiment of this invention.

Amplification of the ultra-low currents contemplated herein so that suitable measurement thereof can be made is obtained by using a low-grid-current electrometer-pentode as one stage of a multistage amplifier having several filamentary amplifier stages using single-ended circuits. The input signal is supplied to the control grid 50 of a type CK5889 electrometer tube 51 appearing in FIG. 3. This tube achieves ultra-low grid currents by means of ultra-high vacuum, precise grid-location, and low supply potentials to prevent the formation of positive ions within the tube. A series resistor 52 in the grid circuit protects the tube from excessive input voltages.

Positive 200 v. potential for the plate 53 of electrometer tube 51 is supplied from terminal 42 of the power supply through series resistors 54, 55 and variable stabilizing resistor 56. Its directly heated cathode 57 receives current from a grounded cathode circuit supplied from grounded terminal 37 of the power supply. The electrometer tube is directly coupled to a second stage amplifier tube 58, a type CK 6088 tetrode. The output of the electrometer appearing in connection 59 is supplied directly to the control grid of amplifier 58. The cathode 60 of amplifier 58 also is supplied from the grounded cathode circuit.

Plate potential for amplifier 58 is supplied through series resistor 61 from the positive 150 v. terminal 38. The output of this tube is coupled through coupling resistor 62 and capacitor 63 to the control grid of amplifier tube 64, also a type CK 6088 tetrode, providing a third stage amplification. Grid bias is furnished from negative terminal 39 through resistor 65. The plate of amplifier 64 is connected through series resistor 66 to the plate supply furnished at terminal 38.

The output of amplifier 64 is connected to the parallel control grids of a type 5965 double triode 67 through coupling capacitor 68 and resistor 69. The companion plates are connected together and receive their potential through series resistor 70 from the plate supply terminal 38. The electrodes of amplifier tube 67 joined in parallel are connected in a cathode follower circuit providing a fourth stage of amplification. The output of the amplifier 2 appears across terminal 71 in the cathode follower circuit and grounded supply terminal 37. Bias is provided to the grids of amplifier 67 from terminal 39 of the power supply through resistor 72. The joined grids are also connected to ground through resistor 73. The filament for amplifier tube 67 is supplied from secondary winding 46 of transformer 19 through terminal 47 and ground as at 48.

The screen grid of amplifier 58 is connected through resistor 74 to its corresponding cathode 60 and through resistor 75 to the plate supply. The screen grid of amplifier tube 64 is connected to plate potential through resistor 76 and to its grounded cathode 77 through resistor 78.

The grounded cathode circuit comprises one branch connected across grounded terminal 37 and the +15 volt terminal 45 of the power supply including cathode 77 of amplifier 64, series resistor 79 and cathode 60 of amplifier tube 58. Another branch of the cathode circuit connected across the foregoing terminals includes series resistors 80 and 81, the latter in parallel with cathode 57 of the electrometer tube 51 and resistor 82. The grounded cathode circuit at terminal 37 is directly connected to the electrometer plate supply through resistor 83.

The screen grid of the electrometer 51 is connected directly to its cathode through series resistors 84 and 85 and to plate potential through series resistors 86 and 56. The junction between resistors 86 and 56 is connected to the cathode circuit and also is connected to the electrometer plate 53 by capacitor 87.

The amplifier output is maintained constant for varying line voltage within the range of 105–125 v. by means of the adjustable stabilizing resistor 56. An adjustable connection 88 in parallel with a portion of resistor 85 is provided to adjust the electometer screen grid potential for "zeroing" the panel meter 13 or connected external meters.

Negative feedback 1 is obtained from the cathode follower circuit of the fourth stage amplifier 67 at the junction between resistor 15 and resistor 16 forming a voltage divider across terminal 71 and ground. A positive feedback 4 in phase with the input impressed upon the electrometer control grid is taken from the plates 89 of the last stage amplifier 67 through series resistor 90, connection 91 and the variable neutralization control resistor 6. Resistor 92 interconnects the positive feedback with the negative terminal 39 of the power supply. Output terminal 71 is also connected to negative terminal 39 through resistor 93.

The derivation of both negative and positive feedback from the same amplifier stage results in an extremely low noise instrument, one of the principal advantages of the present invention.

The values of the several components of the amplifier circuits are as follows:

| | |
|---|---|
| Capacitor **5** | 4–100 mmf./Hammerlund APC–100. |
| Resistor **6** | 0–50,000 ohms, 2 watts, Ohmite CU 5031. |
| Resistor **15** | 2,000 ohms, ½ watt, 5%. |
| Resistor **16** | 18,000 ohms, ½ watt, 5%. |
| Electrometer tube **51** | Type CK 5889. |
| Resistor **52** | 1,000,000 ohms, ½ watt, 5%. |
| Resistors **54**, **69** | 180,000 ohms, ½ watt, 5%. |
| Resistor **55** | 511,000 ohms, ½ watt, 1%. |
| Resistor **56** | 500 ohms, 2 watts, Ohmite CU 5011. |
| Amplifier tubes **58**, **64** | Type CK 6088. |
| Resistor **61** | 82,000 ohms, ½ watt, 5%. |
| Resistor **62** | 150,000 ohms, ½ watt, 5%. |
| Capacitors **63**, **68** | 30 mmf./600 volts, ceramic. |
| Resistor **65** | 240,000 ohms, ½ watt, 5%. |
| Resistor **66**, **76** | 100,000 ohms, ½ watt, 5%. |
| Amplifier tube **67** | Type 5965. |
| Resistor **70** | 3,300 ohms, ½ watts, 5%. |
| Resistor **72** | 360,000 ohms, ½ watt, 5%. |
| Resistor **73** | 62,000 ohms, ½ watt, 5%. |
| Resistors **74**, **78** | 47,000 ohms, ½ watt, 5%. |
| Resistor **75** | 75,000 ohms, ½ watt, 5%. |
| Resistor **79** | 560 ohms, 3 watts, WW. |
| Resistor **80** | 1,500 ohms, 3 watts, WW, 3%. |
| Resistor **81** | Adjusted for 1.0 v. across 5889 filament. |
| Resistor **82** | 225 ohms, 3 watts, WW. |
| Resistor **83** | 15,000 ohms, ½ watt, 1%. |
| Resistor **84** | 16,000 ohms, ½ watt, 1%. |
| Resistor **85** | 5,000 ohms, 2 watts, Helipot. |
| Resistor **86** | 30,000 ohms, ½ watt, 1%. |
| Capacitor **87** | 0.01 mf./600 v., ceramic. |
| Resistor **90** | 560,000 ohms, ½ watt, 5%. |
| Resistor **92** | 470,00 ohms, ½ watt, 5%. |
| Resistor **93** | 20,000 ohms, 5 watts, WW. |

*Response Check*

Figure 5:
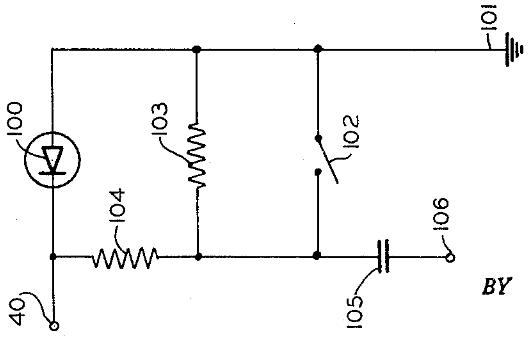
FIG. 5 is a circuit diagram of a response checking means used in the preferred embodiment of this invention.

An internal response checking means is provided to permit optimum adjustment of the neutralization control resistor 6 with the aid only of an oscilloscope. An internal 60 cycle per second square wave generator, illustrated in FIG. 5 and consisting of a Zener diode 100, is supplied with a 60 c.p.s. alternating voltage across terminal 40 of the power supply and ground as at 101. A response check switch 102 and resistor 103 are connected in parallel with diode 100. By manipulating response check switch 102 the output of diode 100 passing through series resistor 104 and capacitor 105 is selectively applied to the electrometer screen grid as at 106 to check the response of the amplifier. For this purpose an oscilloscope synchronized to the 60 cycle per second line is connected to terminals 12 and 9. The switch 102 is turned "on" and neutralization resistor 6 advanced until sharp spikes appear on the oscilloscope. Optimum adjustment is indicated by a slight ringing in the amplifier, with a ringing decrement of about a factor of four per cycle.

Values of the various components of the response checking means are as follows:

| | |
|---|---|
| Diode **100** | Type 1N1314, Hoffman. |
| Resistor **103** | 820 ohms, ½ watt, 5%. |
| Resistor **104** | 100,000 ohms, ½ watt, 5%. |
| Capacitor **105** | 0.05 mf./200 volts. |

*Range Switch*

The individual resistors comprising variable input resistor 3 and variable resistors 18*a*, 18*b* at the instrument output are simultaneously interconnected into the instrument circuits in discrete incremental steps by means of a multiple range switch 17 which permits measurement of a variety of current ranges with the single instrument described herein. The range switch 17 comprises three separate switches interlocked for simultaneous movement and designated as variable resistors 3, 18*a*, 18*b* in FIG. 1 and illustrated in detail in FIG. 4. Each switch has sixteen corresponding contact points which connect individual resistors into the instrument circuits for predetermined instrument ranges.

Figure 4:
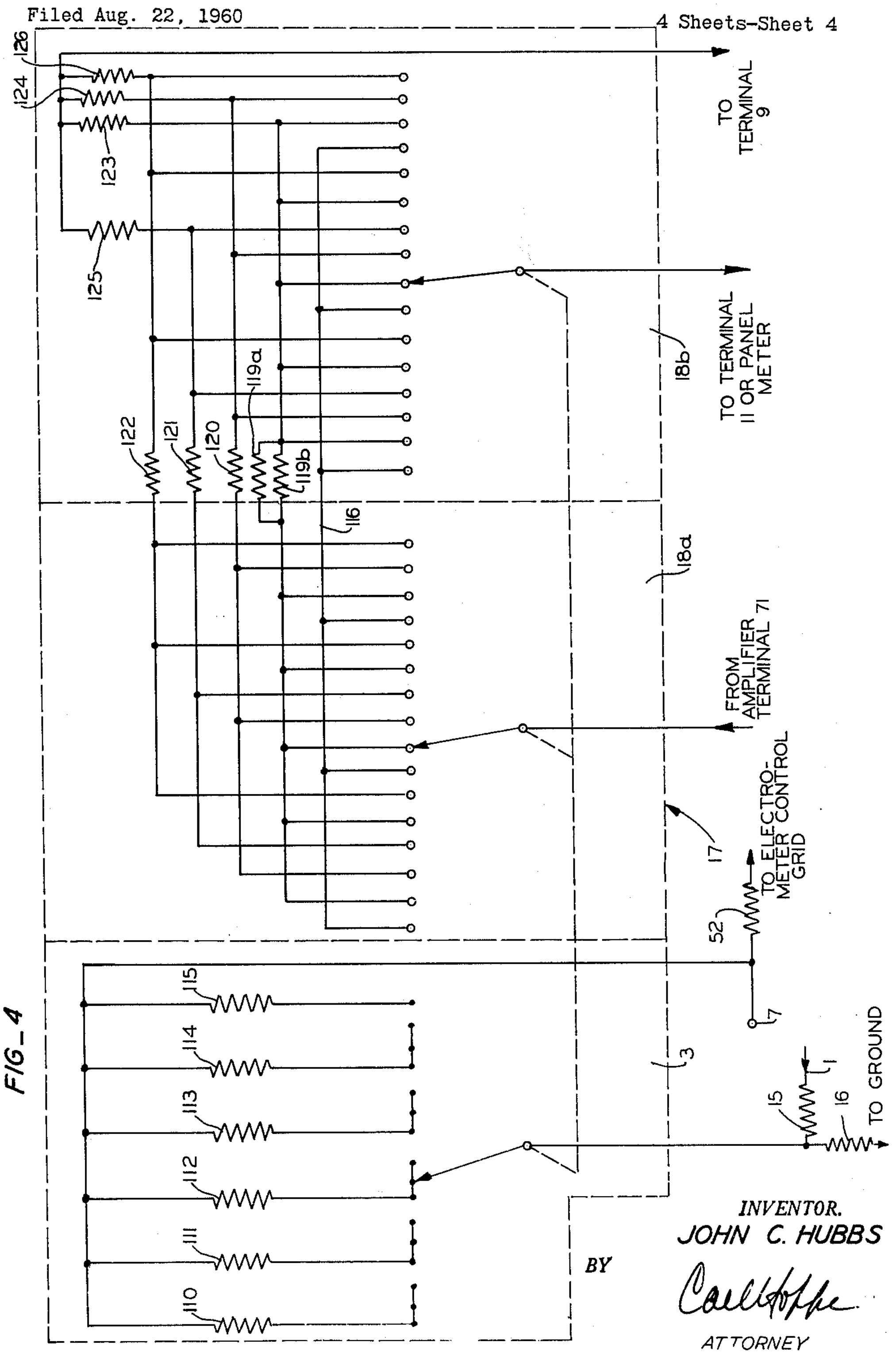
FIG. 4 is a circuit diagram of a range switch used in the preferred embodiment of this invention.

Referring specifically to FIG. 4 it will be observed that the input resistor 3 actually is one of a plurality of individual resistors 110, 111, 112, 113, 114 or 115 connected across the instrument input for a specific instrument range. The first three contact points switch resistor 110 into the circuit, contact points four through six connect resistor 111, contact points seven through nine connect resistor 112, contact points ten through twelve connect resistor 113, contact points thirteen through fifteen connect resistor 114 and contact point sixteen connects resistor 115.

Simultaneously, range switch 17 connects a corresponding individual resistor, indicated as variable resistor 18*a* in FIG. 1, between the instrument output appearing at terminal 11 and the amplifier output terminal 71. It will be observed in FIG. 4 that contact points one, seven and thirteen provide a direct path 116 from the amplifier output 71 either to output terminal 11 or the panel meter 13 connected in parallel across fixed resistors 117 and 118 illustrated in FIG. 1, which resistors provide output voltage division for terminals 10 and 11, respectively. Contact points two, five, eight, eleven and fourteen connect parallel resistors 119*a* and 119*b* into the circuit, contact points three, nine and fifteen connect resistor 120 into the circuit, contact points four and ten connect resistor 121 into the circuit and contact points six, twelve and sixteen connect resistor 122 into the circuit.

The range switch 17 simultaneously connects one of a series of shunt resistors 123, 124, 125 and 126, indicated as variable resistor 18*b* in FIG. 1, across terminals 11 and 9, thereby shunting these terminals as well as the panel meter 13. Shunt resistor 123 is connected to the circuit by the contact points of resistor 18*b* corresponding to the contact points of interlocked resistor 18*a* which connect resistors 119*a* and 119*b*. Similarly, the corresponding contact points of resistor 18*b* connect the other shunt resistors into the circuit. Resistor 124 corresponds to resistor 120, resistor 125 corresponds to resistor 121 and resistor 126 corresponds to resistor 122.

Outputs for A.-C. measurement are available across terminals 9 and 10 or 9 and 11 in accordance with the range switch and also across terminals 9 and 12 independent of the range switch. D.-C. indication is available directly from panel meter 13 or from 10 and 100 mv. recording potentiometers which can be attached across terminals 9 and 10 or terminals 9 and 11, respectively.

The values for the resistors of the range switch and output voltage divider are as follows:

| | |
|---|---|
| Resistor **110** | $3\times10^{12}$ ohms, ½ watt, 2%. |
| Resistor **111** | $1\times10^{11}$ ohms, ½ watt, 1%. |
| Resistor **112** | $3\times10^{9}$ ohms, ½ watt, 1%. |
| Resistor **113** | $1\times10^{8}$ ohms, ½ watt, 1%. |
| Resistor **114** | $3\times10^{6}$ ohms, ½ watt, 1%. |
| Resistor **115** | $1\times10^{6}$ ohms, ½ watt, 1%. |
| Resistor **117** | 200 ohms, ½ watt, 1%. |
| Resistor **118** | 1,820 ohms, ½ watt, 1%. |
| Resistor **119***a* | 11,000 ohms, ½ watt, 5%. |
| Resistor **119***b* | 750 ohms, ½ watt, 1%. |
| Resistors **120**, **122** | 910 ohms, ½ watt, 1%. |
| Resistors **121**, **126** | 100 ohms, ½ watt, 1%. |
| Resistor **123** | 430 ohms, ½ watt, 1%. |
| Resistor **124** | 110 ohms, ½ watt, 1%. |
| Resistor **125** | 9,100 ohms, ½ watt, 5%. |

The foregoing detailed description of a specific embodiment of the present invention has been given for clearness of understanding only and no unnecessary limitation should be understood therefrom for modifications will be obvious to those skilled in the art. For example, although vacuum tubes have been used in the specific embodiment described other electronic value means such as transistors are also useful in the amplifier with appropriate modifications in the circuit values. The invention, therefore, is defined by the following claims.

I claim:

1. An electronic amplifier having a first and a second input terminal; an output circuit including electronic valve means responsive to a signal supplied to said input terminals, said electronic valve means having at least two electrodes connected across a source of electric potential; said source of electric potential biasing said first input terminal at a potential intermediate that of said electrodes; a first voltage dividing means connecting a first one of said electrodes with said first input terminal; a second voltage dividing means connecting the second one of said electrodes with said first input terminal; negative feedback means including a resistor interconnecting said first voltage dividing means and said second input terminal; and positive feedback means including a capacitor interconnecting said second voltage dividing means and said second input terminal.

2. A multistage amplifier having a first and a second input terminal and an output stage including electronic valve means responsive to a signal supplied to said input terminals and having at least a grid, an anode and a cathode, the improvement comprising a source of electric potential having its most negative terminal connected to said cathode, its most positive terminal connected to said anode, and an intermediate terminal connected to said first input terminal to hold said first input terminal at a potential intermediate that of said cathode and anode; means for applying a negative feedback derived from said cathode to said second input terminal; and means for applying a positive feedback derived from said anode to said second input terminal, including voltage dividing means connecting said first input terminal and said anode, and a variable capacity interconnecting said voltage dividing means and said second input terminal.

References Cited in the file of this patent

UNITED STATES PATENTS

| | | |
|---|---|---|
| 2,236,690 | Mathes | Apr. 1, 1941 |
| 2,282,383 | Root | May 12, 1942 |
| 2,305,893 | Oman | Dec. 22, 1942 |
| 2,798,905 | Graham | July 9, 1957 |
| 2,916,702 | Bigelow | Dec. 8, 1959 |

FOREIGN PATENTS

| | | |
|---|---|---|
| 668,232 | Great Britain | Mar. 12, 1952 |